United States Patent
Hu (10) Patent No.: US 10,528,397 B2
(45) Date of Patent: Jan. 7, 2020

(54) METHOD, DEVICE, AND NON-TRANSITORY COMPUTER READABLE STORAGE MEDIUM FOR CREATING VIRTUAL MACHINE

(71) Applicant: American Megatrends International, LLC, Norcross, GA (US)

(72) Inventor: Chih-Kai Hu, Taipei (TW)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 0 days.

(21) Appl. No.: 15/811,165

(22) Filed: Nov. 13, 2017

(65) Prior Publication Data
US 2019/0146851 A1 May 16, 2019

(51) Int. Cl.
*G06F 9/50* (2006.01)
*G06F 9/445* (2018.01)
*G06F 9/455* (2018.01)

(52) U.S. Cl.
CPC ........ *G06F 9/5077* (2013.01); *G06F 9/44505* (2013.01); *G06F 9/45558* (2013.01); *G06F 2009/4557* (2013.01); *G06F 2009/45562* (2013.01)

(58) Field of Classification Search
CPC .................................................. G06F 9/5077
USPC ...................................................... 718/1–108
See application file for complete search history.

(56) References Cited

U.S. PATENT DOCUMENTS

| | | | | |
|---|---|---|---|---|
| 8,316,248 B2* | 11/2012 | Yokota | ................... | G06F 1/3209 709/224 |
| 8,595,723 B2* | 11/2013 | Garrett | ................ | G06F 9/45533 713/100 |
| 9,130,903 B2* | 9/2015 | Ryman | ................... | H04L 67/025 |
| 9,959,146 B2* | 5/2018 | Ahuja | ..................... | G06F 9/505 |
| 2009/0125901 A1* | 5/2009 | Swanson | ............. | G06F 9/45558 718/1 |
| 2010/0318993 A1* | 12/2010 | Goud | ................... | G06F 9/45537 718/1 |
| 2016/0203017 A1* | 7/2016 | Davenport | .......... | H04L 67/1008 718/1 |

(Continued)

OTHER PUBLICATIONS

Angiuoli, Samuel V., et al. "CloVR: a virtual machine for automated and portable sequence analysis from the desktop using cloud computing." BMC bioinformatics 12.1 (2011): pp. 1-15 (Year: 2011).*

(Continued)

*Primary Examiner* — Satish Rampuria
(74) *Attorney, Agent, or Firm* — Birch, Stewart, Kolasch & Birch, LLP (57) ABSTRACT

A method includes receiving, via a controlling Baseboard management controller (BMC), a request for a virtual machine (VM); providing, via the controlling BMC, a notification for requesting the VM to one or more candidate BMCs, to make at least one of the candidate BMCs provide an available response in response to resources monitored by the second BMC are sufficient for the VM; and assigning, via the controlling BMC, an assigned BMC to perform a VM creating operation according to the available response, such that the assigned BMC requests one or more processors corresponding thereto to create the VM.

14 Claims, 4 Drawing Sheets

(56) References Cited

U.S. PATENT DOCUMENTS

2016/0359890 A1* 12/2016 Deen .................. G06F 3/0482
2017/0206110 A1* 7/2017 Huang ............... G06F 9/45558

OTHER PUBLICATIONS

Bonkoski, Anthony, Russ Bielawski, and J. Alex Halderman. "Illuminating the security issues surrounding lights-out server management." Presented as part of the 7th {USENIX} Workshop on Offensive Technologies. 2013.pp. 1-9 (Year: 2013).*
Pruett, G. R. E. G., et al. "BladeCenter systems management software." IBM journal of research and development 49.6 (2005): pp. 963-975. (Year: 2005).*
Niyogi, Partha, Federico Girosi, and Tomaso Poggio. "Incorporating prior information in machine learning by creating virtual examples." Proceedings of the IEEE 86.11 (1998): pp. 2196-2209. (Year: 1998).*
Ruth, Paul, et al. "Virtual distributed environments in a shared infrastructure." Computer 38.5 (2005): pp. 63-69. (Year: 2005).*
Rosenblum, Mendel, and Tal Garfinkel. "Virtual machine monitors: Current technology and future trends." Computer38.5 (2005): pp. 39-47. (Year: 2005).*

* cited by examiner

METHOD, DEVICE, AND NON-TRANSITORY COMPUTER READABLE STORAGE MEDIUM FOR CREATING VIRTUAL MACHINE

BACKGROUND

Technical Field

The present disclosure relates to a device, a method, and a non-transitory computer readable storage medium. More particularly, the present disclosure relates to an electronic device, a method, and a non-transitory computer readable storage medium for creating a virtual machine.

Description of Related Art

With advances in technology, virtual machines (VMs) are being increasingly used.

A typical server system may use a hypervisor to manage virtual machines. When receiving a request for a VM, the hypervisor may request backboard management controllers (BMCs) of different devices to provide resource information (e.g., CPU loading, memory usage, and/or storage usage) monitored thereby to assign an appropriate device to create a VM. However, the complexity of the hypervisor is being increased along with the server system scaling up. Hence, a more efficient method should be provided.

SUMMARY

One aspect of the present disclosure is related to a method. In accordance with one embodiment of the present disclosure, the method includes receiving, via a controlling Baseboard management controller (BMC), a request for a virtual machine (VM); providing, via the controlling BMC, a notification for requesting the VM to one or more candidate BMCs, to make at least one of the candidate BMCs provide an available response in response to resources monitored by the at least one of the candidate BMCs are sufficient for the VM; and assigning, via the controlling BMC, an assigned BMC to perform a VM creating operation according to the available response, such that the assigned BMC requests one or more processors corresponding thereto to create the VM.

Another aspect of the present disclosure is related to a device. In accordance with one embodiment of the present disclosure, the device includes a controlling BMC and one or more programs. The controlling BMC comprises a memory. The one or more programs are stored in the memory and configured to be executed by the controlling BMC. The one or more programs include instructions for receiving a request for a VM; providing a notification for requesting the VM to one or more candidate BMCs, to make at least one of the candidate BMCs provide an available response in response to resources monitored by the at least one of the candidate BMCs are sufficient for the VM; and assigning an assigned BMC to perform a VM creating operation according to the available response, such that the assigned BMC requests one or more processors corresponding thereto to create the VM.

Another aspect of the present disclosure is related to a non-transitory computer readable storage medium. In accordance with one embodiment of the present disclosure, the non-transitory computer readable storage medium storing one or more programs includes instructions, which when executed, causes controlling BMC to perform operations including receiving, via a controlling BMC, a request for a VM; providing, via the controlling BMC, a notification for requesting the VM to one or more candidate BMCs, to make at least one of the candidate BMCs provide an available response in response to resources monitored by the at least one of the candidate BMCs are sufficient for the VM; and assigning, via the controlling BMC, an assigned BMC to perform a VM creating operation according to the available response, such that the assigned BMC requests one or more processors corresponding thereto to create the VM.

Through the operations of one embodiment described above, the controlling BMC can acknowledge the server device having sufficient resource and assign this server device to create the VM thereon.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "electrically connected" or "electrically coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, the meaning of "a," "an," and "the" includes reference to the plural unless the context clearly dictates otherwise.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
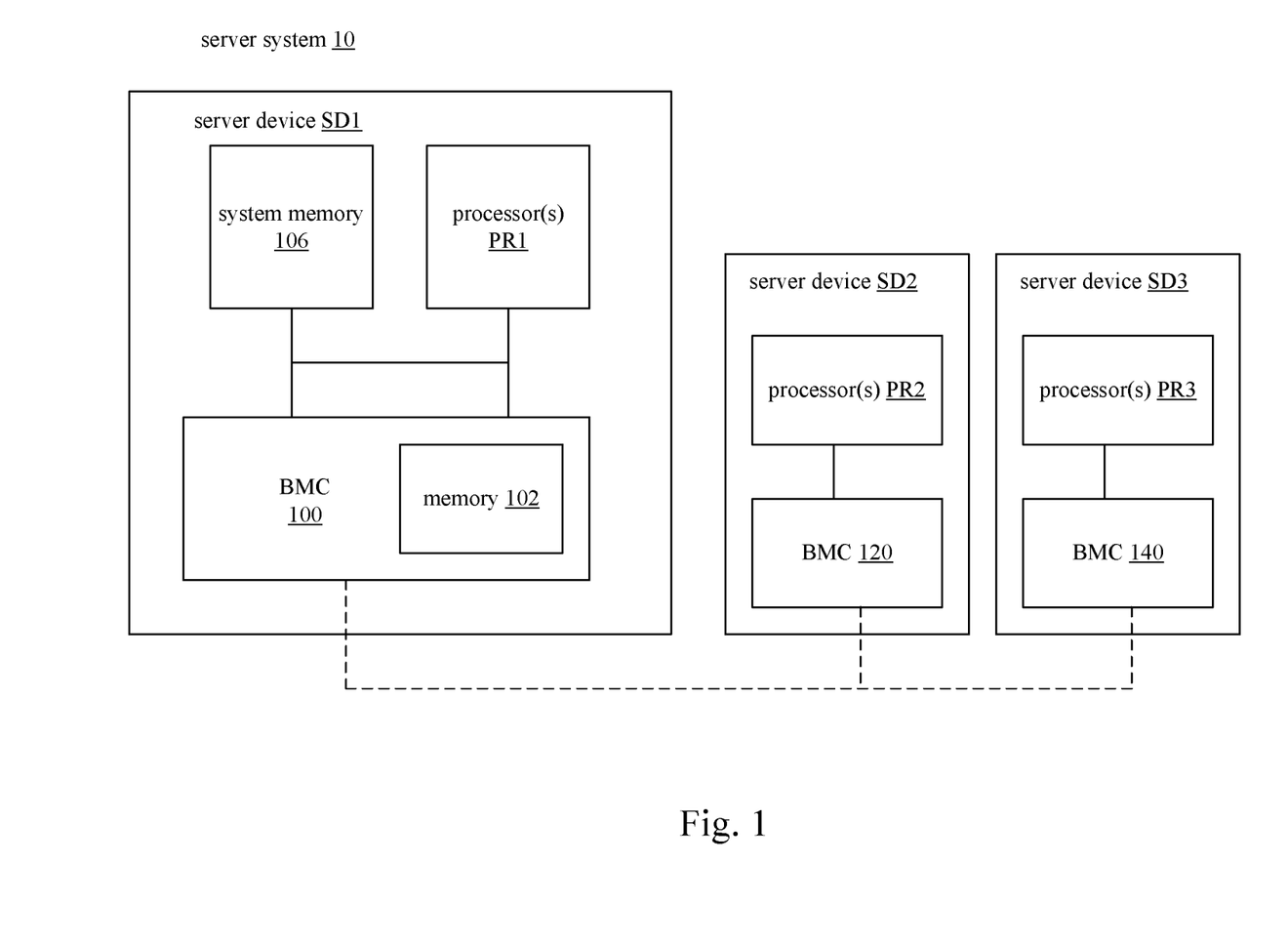
FIG. 1 is a schematic block diagram of a server system in accordance with one embodiment of the present disclosure.

FIG. 1 is a schematic block diagram of a server system 10 in accordance with one embodiment of the present disclosure. In this embodiment, the server system 10 includes a plurality of server devices, such as server devices SD1-SD3. It should be noted that, although 3 server devices are taken as a descriptive example, another number (e.g., 2 or 4) of the server devices are within the contemplated scope of the present disclosure.

In this embodiment, the server device SD1 includes one or more processors PR1, a system memory 106, and a Baseboard management controller (BMC) 100 (also referred as controlling BMC). The one or more processors PR1 are electrically connected to the BMC 100 and the system memory 106. The BMC 100 is configured to monitor the resource of server device SD1, such as processor loadings (e.g., including the loadings of the one or more processors PR1), memory usages (e.g., including the usage of the system memory 106), and storage usages, and provide such information to other devices. In one embodiment, the BMC 100 includes a memory 102.

In one embodiment, the one or more processing components 110 can be realized by, for example, one or more processors, such as central processors and/or microprocessors, but are not limited in this regard. In one embodiment, the memory 102 includes one or more memory devices, each of which comprises, or a plurality of which collectively comprise a computer readable storage medium. The memory 102 may include a read-only memory (ROM), a flash memory, a database accessible from a network, or any storage medium with the same functionality that can be contemplated by persons of ordinary skill in the art to which this invention pertains.

In one embodiment, the BMC 100 may run or execute various programs and/or sets of instructions stored in the memory 102 to perform various functions for the server device SD1 and to process data.

It should be noted that the ways in which the devices and components in the server device SD1 realized are not limited by the embodiments described above. In addition, the connections among these devices and components are not limited by the embodiments described above. Any configuration of these devices and components and interconnections there among that would enable the server device SD1 to practice the technical features described below and/or in the claims can be used herein.

In one embodiment, the server devices SD2, SD3 may have structures and configurations identical and/or similar to the server device SD1. However, the embodiment is not limited in this regard.

In one embodiment, the BMC 100 is capable of communicating with the BMC 120 of the server device SD2 and the BMC 140 of the server device SD3 via wire or wireless communication technology.

In one embodiment, the BMC 100 is configured to receive a request for a virtual machine (VM). The BMC 100 can provide a notification of such a request to the BMCs 120, 140, to make the server devices SD2, SD3 to determine whether the server devices SD2, SD3 monitored thereby have sufficient resources (e.g., processor loading, memory usage, and/or storage usage) and accordingly return available responses. In response to the BMC 100 receive an available response from one of the BMCs 120, 140, the BMC 100 can assign the one of the BMCs 120, 140 providing the available response to perform a VM creating operation, so that the assigned BMC requests the one or more processors corresponding thereto (i.e., the processor(s) PR2 or the processor(s) PR3) to create the VM. In one embodiment, the one or more processors may create the VM by using a hypervisor application.

Through such operations and configurations, the BMC 100 can acknowledge the server device having sufficient resource and assign this server device to create the VM thereon.

Details of the present disclosure are described in the paragraphs below with reference to an operating method in FIG. 2. However, the present disclosure is not limited to the embodiment below.

It should be noted that the operating method can be applied to a BMC having a structure and a connection that is the same as or similar to the structure and the connection of the BMC 100 shown in FIG. 1. To simplify the description below, the embodiment shown in FIG. 1 will be used as an example to describe the operating method according to an embodiment of the present disclosure. However, the present disclosure is not limited to application to the embodiment shown in FIG. 1.

It should be noted that, in some embodiments, the operating method may be implemented as a program. When the program is executed by a computer, an electronic device, or BMC 100 in FIG. 1, this executing device performs the operating method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following operating method, no particular sequence is required unless otherwise specified. Moreover, the following operations also may be performed simultaneously or the execution times thereof may at least partially overlap.

Furthermore, the operations of the following operating method may be added to, replaced, and/or eliminated as appropriate, in accordance with various embodiments of the present disclosure.

Figure 2:
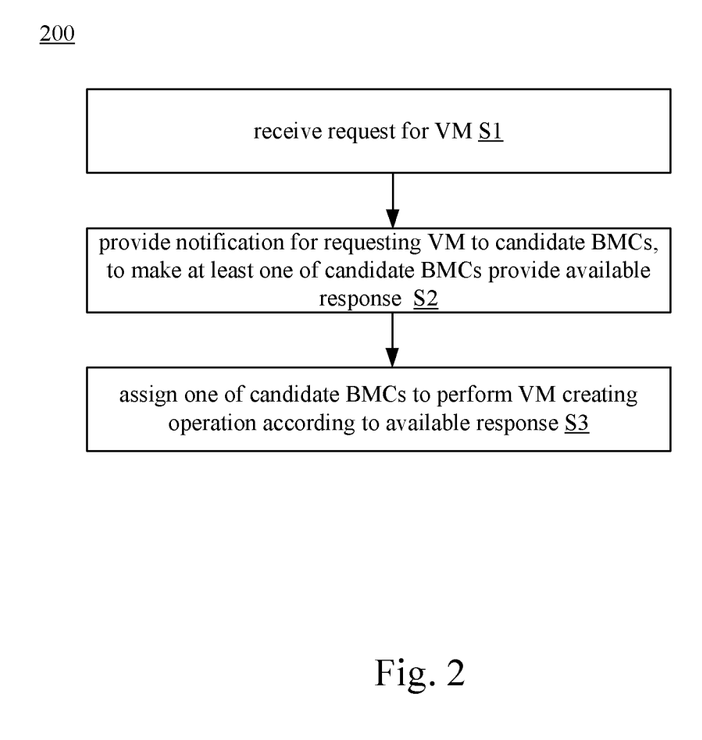
FIG. 2 is a flowchart of a operating method in accordance with one embodiment of the present disclosure.

Reference is made to FIGS. 1 and 2. The operating method 200 includes the operations below.

In operation S1, the BMC 100 receives a request for a VM. In one embodiment, the request may be provided by a user or another component or device. In one embodiment, the request may include a resource requirement for the VM.

In operation S2, the BMC 100 provides a notification for requesting the VM to the BMCs 120, 140 (also referred as candidate BMCs), to make at least one of the BMCs 120, 140 provide an available response in response to resources monitored by this or these BMCs are sufficient for the VM.

In one embodiment, the BMC 100 may broadcast the notification for requesting the VM to the BMCs 120, 140 all at once, and waiting for the available responses from both of the BMCs 120, 140. In a different embodiment, the BMC 100 may transmit the notification for requesting the VM to the BMCs 120, 140 and waiting for the available responses one by one. In one embodiment, once the BMC 100 receives an available response from one of the BMCs 120, 140, the BMC 100 may terminate this notification operation. In another embodiment, this notification operation may be terminated when all of the available responses are received or timeout occurs.

In one embodiment, the notification may include a resource requirement (e.g., a memory requirement and/or a storage requirement) of the requested VM. The BMCs 120, 140 may receive the notification with the resource requirement, and respectively determine whether the resources monitored thereby satisfy the resource requirement. In response to the resources monitored by the BMCs 120, 140 (e.g., resources within the server devices SD2, SD3) satisfy the resource requirement, the BMCs 120, 140 would provide available responses to the BMC 100 to indicate that the resources monitored by the BMCs 120, 140 are sufficient to create the VM. In one embodiment, in the case that the resources monitored by the BMCs 120, 140 do not satisfy the resource requirement, the BMCs 120, 140 would provide unavailable responses or would not provide responses to the BMC 100.

In one embodiment, the BMCs 120, 140 may provide the available responses to the BMC 100 with timestamps, so that the BMC 100 can calculate response times of the available responses relative to the notification according to the timestamps.

In operation S3, the BMC 100 assigns one of the BMCs 120, 140 to perform a VM creating operation according to the available response provide thereby, such that the assigned BMC requests one or more processors corresponding thereto to create the requested VM.

In one embodiment, in response to the BMC 100 receive only one available response, the BMC 100 can assign the BMC which provides the available response to perform the VM creating operation. For example, in a case that the BMC 140 provides the available response to the BMC 100 and the BMC 120 does not provide the available response to the BMC 100, the BMC 100 assigns the BMC 140 to perform the VM creating operation.

In one embodiment, in response to the BMC 100 receive more than one available responses, the BMC 100 can assign one of the BMCs 120, 140 which provides the available response with a shortest response time relative to the notification according to the timestamps. For example, in a case that both of the BMCs 120, 140 provides the available responses, and the response time (e.g., 100 ms) of the available response provided by the BMC 120 is shorter than the response time (e.g., 200 ms) of the available response provided by the BMC 140, the BMC 100 assigns the BMC 120 to perform the VM creating operation.

Through such operations and configurations, the BMC 100 can control a server device with sufficient resources to create a VM thereon.

In a different embodiment of the present disclosure, before operation S2, the BMC 100 may determine whether the resources monitored by itself are sufficient for the requested VM. If so, the BMC 100 may request the one or more processor PR1 to create the requested VM on the server device SD1 without performing operations S2, S3. If not, the BMC 100 performs operations S2, S3 as described above. It should be noted that details of such an embodiment can be ascertained with reference to the paragraph described above, and a description in this regard will not be repeated herein.

Figure 3:
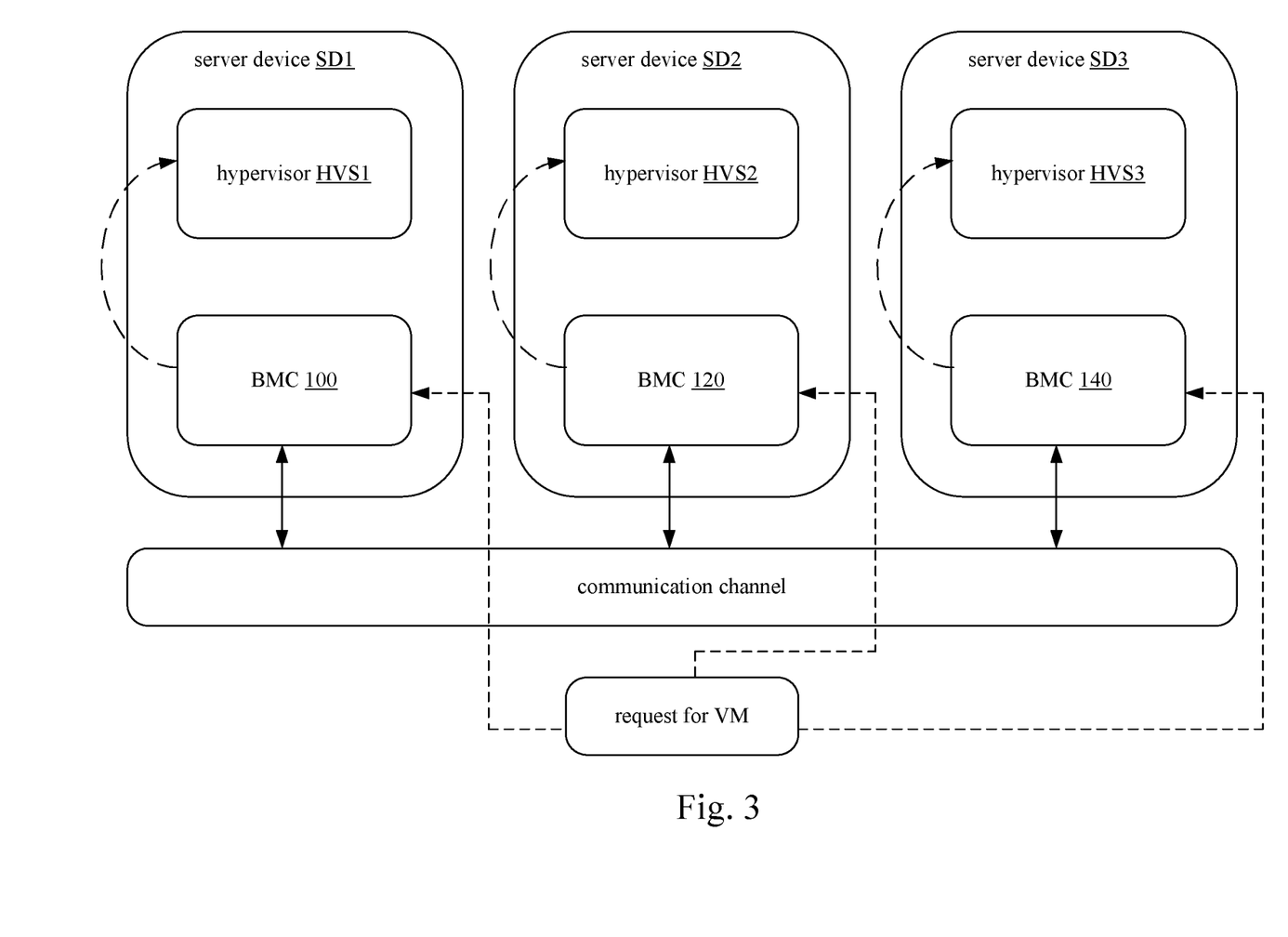
FIG. 3 illustrates an operative example of operations of the server system in accordance with another embodiment of the present disclosure.

In the paragraphs below, an operative embodiment will be described with reference to FIG. 3. However, the present disclosure is not limited to the embodiment below.

In this operative embodiment, the server device SD1 has a BMC 100 and a hypervisor HVS1, the server device SD2 has a BMC 120 and a hypervisor HVS2, and the server device SD3 has a BMC 140 and a hypervisor HVS3. In this operative embodiment, all of the BMCs 100, 120, 140 may receive a request for a VM. In one embodiment, the hypervisors HVS1-HVS3 may be respectively implemented by the processors PR1-PR3.

In this case, when the BMC 140 receives the request for a VM, the BMC 140 determines whether the resources in the server device SD3 monitored by the BMC 140 satisfy the resource requirement of the requested VM. If so, the BMC 140 requests the hypervisor HVS3 to create the requested VM. If not, the BMC 140 transmit a notification for requesting the VM to a communication channel so that the other server devices SD1, SD2 can be notified.

When the BMC 120 receives the notification via the communication channel, the BMC 120 determines whether the resources in the server device SD2 monitored by the BMC 120 satisfy the resource requirement of the requested VM. If so, the BMC 120 may inform the other BMCs 100, 140 about it, and thereafter request the hypervisor HVS2 to create the requested VM on the server device SD2. If not, the BMC 120 may inform the other BMCs 100, 140 about it.

Similarly, when the BMC 100 receives the notification via the communication channel, the BMC 100 determines whether the resources in the server device SD1 monitored by the BMC 100 satisfy the resource requirement of the requested VM. If so, the BMC 100 may inform the other BMCs 120, 140 about it, and thereafter request the hypervisor HVS1 to create the requested VM on the server device SD1. If not, the BMC 100 may inform the other BMCs 120, 140 about it.

When both of the server devices SD1, SD2 are available to create the request VM, the BMC 140 may assign one of the server devices SD1, SD2 will create the VM according to a priority. In one embodiment, the priority may be preset, determined according to the response times relative to the notification for requesting the VM, or determined according to the resources in the server devices SD1, SD2, but the present disclosure is not limited in this regard.

Figure 4:
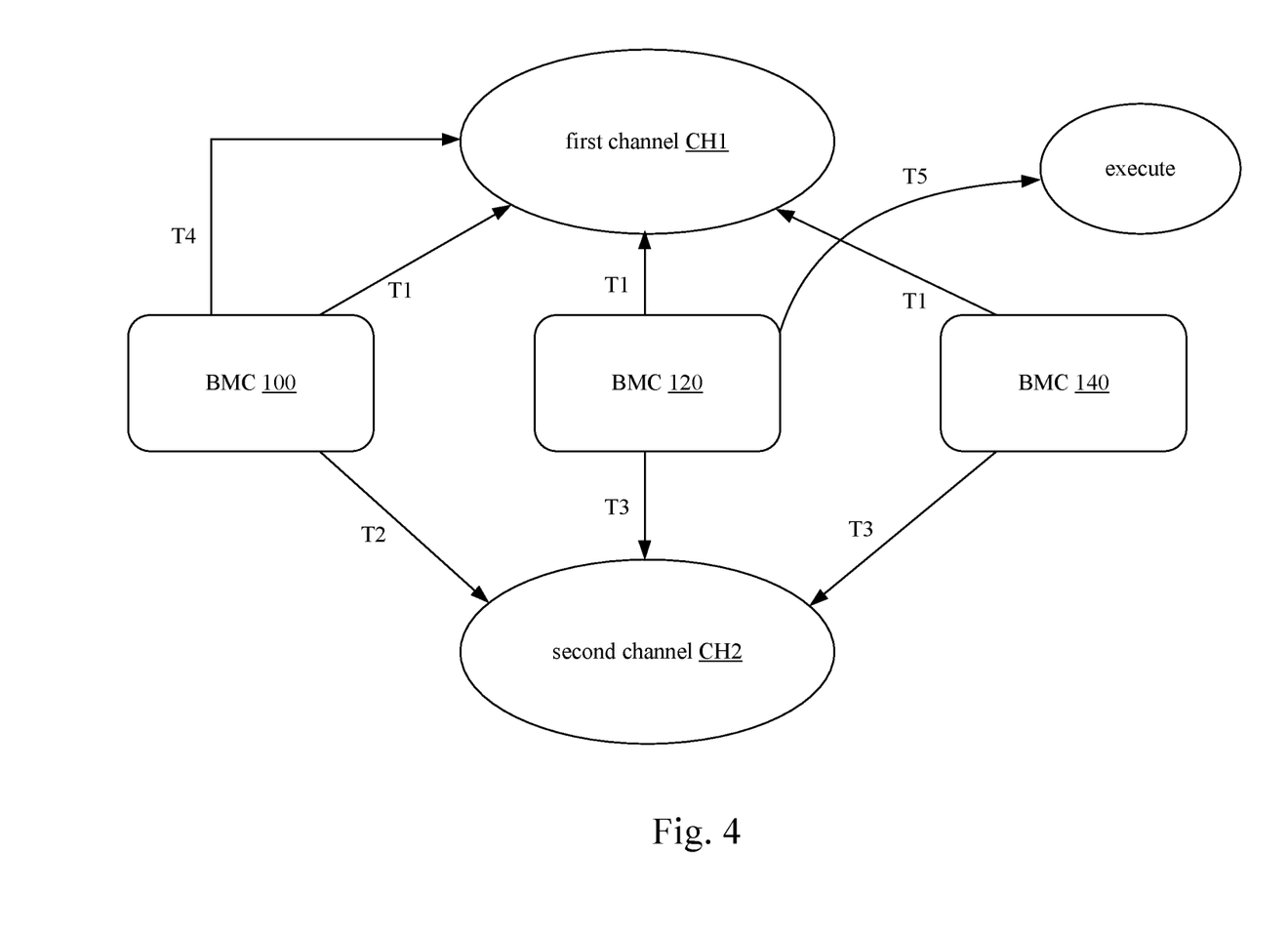
FIG. 4 illustrates another operative example of operations of the server system in accordance with another embodiment of the present disclosure.

In the paragraphs below, an operative embodiment will be described with reference to FIG. 4. However, the present disclosure is not limited to the embodiment below.

In this operative embodiment, the BMCs 100, 120, 140 may communicate with each other by using channels CH1, CH2.

In operation T1, the BMCs 100, 120, 140 subscribe the channels CH1, so that the BMCs 100, 120, 140 can receive information on the first channel CH1.

In this operative embodiment, after the BMC 100 receives a request for a VM, the BMC 100 may post a notification message with the resource requirement of the requested VM on the first channel CH1. The BMCs 120, 140 can get the notification message with the resource requirement of the requested VM on the first channel CH1 and determine whether the resources in the server devices SD2, SD3 satisfy the resource requirement of the VM.

In operation T2, the BMC 100 creates and subscribes the second channel CH2. In some different embodiments, the second channel CH2 may be created by another device, and the present disclosure is not limited by this embodiment.

In operation T3, the BMCs 120, 140 subscribe the second channel CH2. In this operative embodiment, in response to the server devices SD2, SD3 satisfy the resource requirement of the VM, the BMCs 120, 140 can post available responses on the channels CH2. In one embodiment, the available response may include a BMC ID and a timestamp. According to the timestamps, the BMC 100 can calculate response times of the available responses from the BMCs 120, 140.

In operation T4, after the BMC 100 gets the available responses from the second channel CH2, the BMC 100 selects one of the BMCs 120, 140 with the fastest available response as an assigned BMC, and post an assignment message on the first channel CH1. In this embodiment, the assignment message may include an assigned BMC ID.

In operation T5, the BMCs 120, 140 get the assigned BMC ID from the first channel CH1 and compare the assigned BMC ID with the BMC ID of itself. In this embodiment, since the assigned BMC ID is identical to the BMC ID of BMC 120, the BMC 120 performs the VM creating operation according to the resource requirement corresponding to the required VM. Since the assigned BMC ID is different from the BMC ID of BMC 140, the BMC 140 does not perform the VM creating operation.

Details of such an operative embodiment can be ascertained with reference to the paragraph described above, and a description in this regard will not be repeated herein.

Although the present invention has been described in considerable detail with reference to certain embodiments thereof, other embodiments are possible. Therefore, the scope of the appended claims should not be limited to the description of the embodiments contained herein.

What is claimed is:

1. A method comprising:
   receiving, via a controlling Baseboard management controller (BMC), a request for a virtual machine (VM);
   providing, via the controlling BMC, a notification for requesting to create the VM to one or more candidate BMCs, to make at least one of the candidate BMCs provide an available response in response to resources monitored by the at least one of the candidate BMCs are sufficient for the VM, wherein the resources include CPU loading, memory usage, or storage usage, wherein the notification for requesting is terminated when the available response is received or a timeout occurs; and
   assigning, via the controlling BMC, an assigned BMC to perform a VM creating operation according to the available response, such that the assigned BMC requests one or more processors corresponding thereto to create the VM;
   wherein the controlling BMC and the one or more candidate BMC subscribe a first communication channel, and the controlling BMC provide the notification for requesting the VM to the one or more candidate BMCs via the first communication channel;
   wherein the controlling BMC provides the notification for requesting the VM with a resource requirement via the first communication channel, so as to make the one or more candidate BMCs determine whether resources monitored thereby satisfy the resource requirement, and make the one or more candidate BMCs accordingly determine whether to provide the available response, wherein several candidate BMCs in the candidate BMCs are available to create the request VM, the controlling BMC assign one of the several candidate BMCs to create the VM according to a priority, wherein the priority is present, determined according to the response times relative to the notification for requesting the VM, or determined according to the resources in the several candidate BMCs.

2. The method as claimed in claim 1, wherein the controlling BMC assigns the assigned BMC to perform the VM creating operation via the first communication channel.

3. The method as claimed in claim 1, wherein the controlling BMC and the one or more candidate BMC subscribe a second communication channel, and the at least one of the candidate BMCs provide the available response via the second communication channel.

4. The method as claimed in claim 3, wherein the at least one of the candidate BMCs provide the available response with timestamps, so that the controlling BMC selects one of the candidate BMCs as the assigned BMC to perform the VM creating operation according to the available response and the timestamps.

5. The method as claimed in claim 4, wherein the controlling BMC selects one of the candidate BMCs with a shortest response time relative to the notification as the assigned BMC according to the timestamps.

6. A device comprising:
   a controlling BMC comprising a memory; and
   one or more programs, wherein the one or more programs are stored in the memory and configured to be executed by the controlling BMC, the one or more programs comprising instructions for:
   receiving a request for a VM;
   providing a notification for requesting to create the VM to one or more candidate BMCs, to make at least one of the candidate BMCs provide an available response in response to resources monitored by the at least one of the candidate BMCs are sufficient for the VM, wherein the resources include CPU loading, memory usage, or storage usage, wherein the notification for requesting is terminated when the available response is received or a timeout occurs; and
   assigning an assigned BMC to perform a VM creating operation according to the available response, such that the assigned BMC requests one or more processors corresponding thereto to create the VM;
   wherein the controlling BMC and the one or more candidate BMC subscribe a first communication channel, and the controlling BMC provide the notification for requesting the VM to the one or more candidate BMCs via the first communication channel;
   wherein the controlling BMC provides the notification for requesting the VM with a resource requirement via the first communication channel, so as to make the one or more candidate BMCs determine whether resources monitored thereby satisfy the resource requirement, and make the one or more candidate BMCs accordingly determine whether to provide the available response, wherein several candidate BMCs in the candidate BMCs are available to create the request VM, the controlling BMC assign one of the several candidate BMCs to create the VM according to a priority, wherein the priority is present, determined according to the response times relative to the notification for requesting the VM, or determined according to the resources in the several candidate BMCs.

7. The device as claimed in claim 6, wherein the controlling BMC assigns the assigned BMC to perform the VM creating operation via the first communication channel.

8. The device as claimed in claim 6, wherein the controlling BMC and the one or more candidate BMC subscribe a second communication channel, and the at least one of the candidate BMCs provide the available response via the second communication channel.

9. The device as claimed in claim 8, wherein the at least one of the candidate BMCs provide the available response with timestamps, so that the controlling BMC selects one of the candidate BMCs as the assigned BMC to perform the VM creating operation according to the available response and the timestamps.

10. The device as claimed in claim 9, wherein the controlling BMC selects one of the candidate BMCs with a shortest response time relative to the notification as the assigned BMC according to the timestamps.

11. A non-transitory computer readable storage medium storing one or more programs comprising instructions, which when executed, causes a controlling BMC to perform operations comprising:
  receiving, via a controlling BMC, a request for a VM;
  providing, via the controlling BMC, a notification for requesting to create the VM to one or more candidate BMCs, to make at least one of the candidate BMCs provide an available response in response to resources monitored by the at least one of the candidate BMCs are sufficient for the VM, wherein the resources include CPU loading, memory usage, or storage usage, wherein the notification for requesting is terminated when the available response is received or a timeout occurs; and
  assigning, via the controlling BMC, an assigned BMC to perform a VM creating operation according to the available response, such that the assigned BMC requests one or more processors corresponding thereto to create the VM;
  wherein the controlling BMC and the one or more candidate BMC subscribe a first communication channel, and the controlling BMC provide the notification for requesting the VM to the one or more candidate BMCs via the first communication channel;
  wherein the controlling BMC provides the notification for requesting the VM with a resource requirement via the first communication channel, so as to make the one or more candidate BMCs determine whether resources monitored thereby satisfy the resource requirement, and make the one or more candidate BMCs accordingly determine whether to provide the available response, wherein several candidate BMCs in the candidate BMCs are available to create the request VM, the controlling BMC assign one of the several candidate BMCs to create the VM according to a priority, wherein the priority is present, determined according to the response times relative to the notification for requesting the VM, or determined according to the resources in the several candidate BMCs.

12. The non-transitory computer readable storage medium as claimed in claim 11, wherein the controlling BMC assigns the assigned BMC to perform the VM creating operation via the first communication channel.

13. The non-transitory computer readable storage medium as claimed in claim 11, wherein the controlling BMC and the one or more candidate BMC subscribe a second communication channel, and the at least one of the candidate BMCs provide the available response via the second communication channel.

14. The non-transitory computer readable storage medium as claimed in claim 13, wherein the at least one of the candidate BMCs provide the available response with timestamps, so that the controlling BMC selects one of the candidate BMCs with a shortest response time relative to the notification as the assigned BMC to perform the VM creating operation according to the available response and the timestamps.

* * * * *